United States Patent
Kestler et al.

(10) Patent No.: US 12,037,121 B2
(45) Date of Patent: Jul. 16, 2024

(54) ICE PROTECTION SYSTEM INCLUDING FREQUENCY DEPENDENT SUSCEPTOR

(71) Applicant: ROHR, INC., Chula Vista, CA (US)

(72) Inventors: Steven Kestler, San Diego, CA (US); Joseph V. Mantese, Ellington, CT (US); Gurkan Gok, Milford, CT (US)

(73) Assignee: ROHR, INC., Chula Vista, CA (US)

( * ) Notice: Subject to any disclaimer, the term of this patent is extended or adjusted under 35 U.S.C. 154(b) by 266 days.

(21) Appl. No.: 17/731,926

(22) Filed: Apr. 28, 2022

(65) Prior Publication Data

US 2023/0348073 A1    Nov. 2, 2023

(51) Int. Cl.
    B64D 15/12    (2006.01)

(52) U.S. Cl.
    CPC ..................... B64D 15/12 (2013.01)

(58) Field of Classification Search
    CPC ......... B64D 15/00; B64D 15/12; B64D 15/20
    See application file for complete search history.

(56) References Cited

U.S. PATENT DOCUMENTS

| | | | | |
|---|---|---|---|---|
| 5,615,849 A * | 4/1997 | Salisbury | ............... | B64D 15/00 219/679 |
| 5,623,821 A * | 4/1997 | Bouiller | ................. | B64D 33/02 219/679 |
| 7,087,876 B2 * | 8/2006 | Petrenko | ................ | B64D 15/12 219/770 |
| 9,463,879 B2 | 10/2016 | Khozikov et al. | | |
| 10,442,523 B2 | 10/2019 | Khozikov et al. | | |
| 11,576,408 B2 * | 2/2023 | Jacobs | ................... | F25D 31/005 |
| 2003/0052230 A1 * | 3/2003 | Feher | ....................... | H05B 6/80 244/134 R |
| 2021/0129997 A1 | 5/2021 | Kestler et al. | | |
| 2021/0207491 A1 | 7/2021 | Kestler et al. | | |

FOREIGN PATENT DOCUMENTS

FR    3096658 A1    12/2020

OTHER PUBLICATIONS

Search Report issued in European Patent Application No. 23170213.5; Application Filing Date Apr. 26, 2023; Date of Mailing Sep. 1, 2023 (6 pages).

* cited by examiner

Primary Examiner — Michael H Wang
(74) Attorney, Agent, or Firm — CANTOR COLBURN LLP (57) ABSTRACT

An aircraft ice protection system includes a frequency a frequency dependent susceptor coupled to a critical surface of an aircraft. A radio frequency (RF) energy source is configured to apply RF energy to the frequency dependent susceptor. The aircraft ice protection system is configured to selectively operate in a susceptor absorbing mode and a water absorbing mode. The aircraft ice protection system operates in the susceptor absorbing mode until a Faraday layer associated with ice formed on the critical surface reaches a target characteristic. When the target characteristic is met, the aircraft ice protection system initiates the water absorbing mode.

20 Claims, 5 Drawing Sheets

ICE PROTECTION SYSTEM INCLUDING FREQUENCY DEPENDENT SUSCEPTOR

BACKGROUND

The present disclosure relates to de-icing systems, and more particularly, to aircraft ice protection systems for preventing or reducing the icing of an aerodynamic surface.

Aircrafts implement ice protection system to prevent and/or remove ice accumulation on a critical surface of the aircraft such as for example, a wing, horizontal stabilizer, engine, pylons, and/or a blade to name a few surfaces. Aircraft ice protection systems include both electrical de-icing systems and non-electrical de-icing systems. Electrical de-icing systems are known to implement a wire or wire mesh structure that is embedded within the critical surface or wrapped around the critical surface. The non-electrical de-icing systems include pneumatic ice protection systems, for example, which use hot air to heat a targeted surface to prevent ice formation. Electrical current is then delivered through the wire or wire mesh to produce heat. The heat, if sufficient, can melt or "shed" collected ice from the critical surface and/or prevent the accretion of ice on the critical surface.

BRIEF DESCRIPTION

According to a non-limiting embodiment, an aircraft ice protection system includes a frequency dependent susceptor coupled to a critical surface of an aircraft, and a radio frequency (RF) energy source configured to apply RF energy to the frequency dependent susceptor. The aircraft ice protection system is configured to selectively operate in a susceptor absorbing mode and a water absorbing mode.

Additionally or alternatively, in this or other embodiments the RF energy source delivers the RF energy having a first frequency to the frequency dependent susceptor in response to operating in the susceptor absorbing mode, and delivers the RF energy having a different second frequency to the frequency dependent susceptor in response to operating in the water absorbing mode.

Additionally or alternatively, in this or other embodiments the RF energy having the first frequency attenuates the frequency dependent susceptor to emit heat therefrom, and wherein the RF energy having the second frequency is transmitted from the frequency dependent susceptor to attenuate a Faraday layer defining a layer of liquid water formed on ice present on the critical surface.

Additionally or alternatively, in this or other embodiments the first frequency falls within a frequency range that includes a first attenuation frequency of a material of the frequency dependent susceptor, and wherein the second frequency falls within a second range that includes a second attenuation frequency of the liquid water.

Additionally or alternatively, in this or other embodiments the first frequency is different from the second frequency.

Additionally or alternatively, in this or other embodiments a controller in signal communication with the radio frequency (RF) energy source, the controller configured to selectively invoke the susceptor absorbing mode and the water absorbing mode.

Additionally or alternatively, in this or other embodiments the controller is configured to switch from the susceptor absorbing mode to the water absorbing mode in response to determining the Faraday layer has a target characteristic.

Additionally or alternatively, in this or other embodiments the controller determines a time period during which the RF energy having the first frequency is delivered to the frequency dependent susceptor, and determines the Faraday layer has the target characteristic in response to the time period exceeding a time period threshold.

Additionally or alternatively, in this or other embodiments the controller determines scattering parameters of the RF energy having the first frequency and determines one or both of a transmission coefficient and a reflection coefficient of the RF energy having the first frequency, and wherein the controller determines the Faraday layer has the target characteristic in response to one or both of the transmission coefficient being less than a transmission coefficient threshold or the reflection coefficient being greater than a reflection coefficient threshold.

Additionally or alternatively, in this or other embodiments at least one dielectric layer covers the critical surface.

Additionally or alternatively, in this or other embodiments the frequency dependent susceptor includes a thin dielectric layer having an upper surface and an opposing lower surface, and wherein at least one of the upper and lower surfaces includes a patterned metallic structure configured to define an absorbance and transmittance response with respect to a frequency of applied RF energy.

According to another non-limiting embodiment, a method is provided for removing ice from a critical surface of an aircraft. The method includes applying, by a radio frequency (RF) energy source, RF energy to a frequency dependent susceptor coupled to the critical surface; selectively operating the aircraft ice protection system in a susceptor absorbing mode and a water absorbing mode; and removing the ice from the critical surface based on the susceptor absorbing mode and a water absorbing mode.

Additionally or alternatively, in this or other embodiments the method further includes delivering, by the RF energy source, the RF energy having a first frequency to the frequency dependent susceptor in response to operating in the susceptor absorbing mode; and delivering the RF energy having a different second frequency to the frequency dependent susceptor in response to operating in the water absorbing mode.

Additionally or alternatively, in this or other embodiments the method further includes attenuating the frequency dependent susceptor using the RF energy having the first frequency attenuates to emit heat therefrom; and transmitting the RF energy having the second frequency from the frequency dependent susceptor to attenuate a Faraday layer defining a layer of liquid water formed on ice present on the critical surface.

Additionally or alternatively, in this or other embodiments the method further includes a feature, wherein the first frequency falls within a frequency range that includes a first attenuation frequency of a material of the frequency dependent susceptor, and wherein the second frequency falls within a second range that includes a second attenuation frequency of the liquid water.

Additionally or alternatively, in this or other embodiments the method further includes a feature wherein the first frequency is different from the second frequency.

Additionally or alternatively, in this or other embodiments the method further includes determining a target characteristic of the Faraday layer; detecting the Faraday layer achieves the target characteristic in response to delivering the RF energy having a first frequency during the susceptor absorbing mode; and switching from the susceptor absorbing mode to the water absorbing mode in response to detecting the Faraday layer has the target characteristic.

Additionally or alternatively, in this or other embodiments the method further includes determining a time period during which the RF energy having the first frequency is delivered to the frequency dependent susceptor; and determining the Faraday layer has the target characteristic in response to the time period exceeding a time period threshold.

Additionally or alternatively, in this or other embodiments the method further includes determining scattering parameters of the RF energy having the first frequency; determining one or both of a transmission coefficient and a reflection coefficient of the RF energy having the first frequency; and determining the Faraday layer has the target characteristic in response to one or both of the transmission coefficient being less than a transmission coefficient threshold or the reflection coefficient being greater than a reflection coefficient threshold.

Additionally or alternatively, in this or other embodiments the method further includes a feature wherein the frequency dependent susceptor includes a thin dielectric layer having an upper surface and an opposing lower surface, and wherein at least one of the upper and lower surfaces includes a patterned metallic structure configured to define an absorbance and transmittance response with respect to a frequency of applied RF energy.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Turning now to an overview of the technology related to the present disclosure, research has proven that ice does not necessarily consist of a single solid state of mass, but rather can include a quasi-liquid layer formed on the surface of the ice. This quasi-liquid layer is referred to as "the Faraday layer" and has been found to exist at temperatures even as low as −38 degrees Celsius (235 Kelvin). As the temperature of the solid ice portion increases, the thickness of the Faraday layer increases thereby contributing to melting and removal of ice.

Liquid water is capable of absorbing radio frequency (RF) energy and resonates at various frequencies such as, for example, about 22 gigahertz (GHz) or about 60 GHz. The amount of energy absorbed by attenuated liquid water increases exponentially as the thickness of the liquid water increases. For instance, liquid water having a thickness of about 0.01 millimeters (mm) absorbs about 0% of the attenuated energy, while liquid water having a thickness of about 1.0 mm absorbs about 16% of the attenuated energy and liquid water having a thickness of about 1.0 mm absorbs about 16% of the attenuated energy and 10.0 mm absorbs about 70% of the attenuated energy. At freezing temperatures the Faraday layer is extremely thin (e.g., less than about 0.01 millimeters).

Various non-limiting embodiments of the present disclosure provides an aircraft ice protection system that includes a frequency dependent susceptor that is configured to change behavior based on the frequency of the RF energy applied thereto by a RF energy source included in the aircraft ice protection system. In this manner, the frequency dependent susceptor allows for more efficiently heat the Faraday layer at low environmental temperatures.

The frequency dependent susceptor therefore allows the aircraft ice protection system to selectively operate in a susceptor absorbing mode and a water absorbing mode. When operating in the susceptor absorbing mode, the RF energy source delivers RF energy having a first frequency to the frequency dependent susceptor. Accordingly, the frequency dependent susceptor absorbs more energy than it transmits, thereby emitting heat that increases the thickness of the Faraday layer.

Once the Faraday layer reaches a target characteristic or property, the ice protection system initiates the water absorbing mode. Accordingly, the RF energy source delivers RF energy having a different second frequency capable of fully or at least partially passing through the frequency dependent susceptor 54, while still capable of heating the liquid water of the increased Faraday layer 50. The second frequency of the RF energy causes the frequency dependent susceptor to transmit more RF energy than it absorbs. That is, the second frequency allows the RF energy to fully, or at least partially pass through, the frequency dependent susceptor such that a substantial amount of the RF energy is passed through. The second frequency of the transmitted RF energy, however, is set such that the RF energy substantially is absorbed by the Faraday layer causing it to absorb heat and melt the underlying ice.

Figure 1:
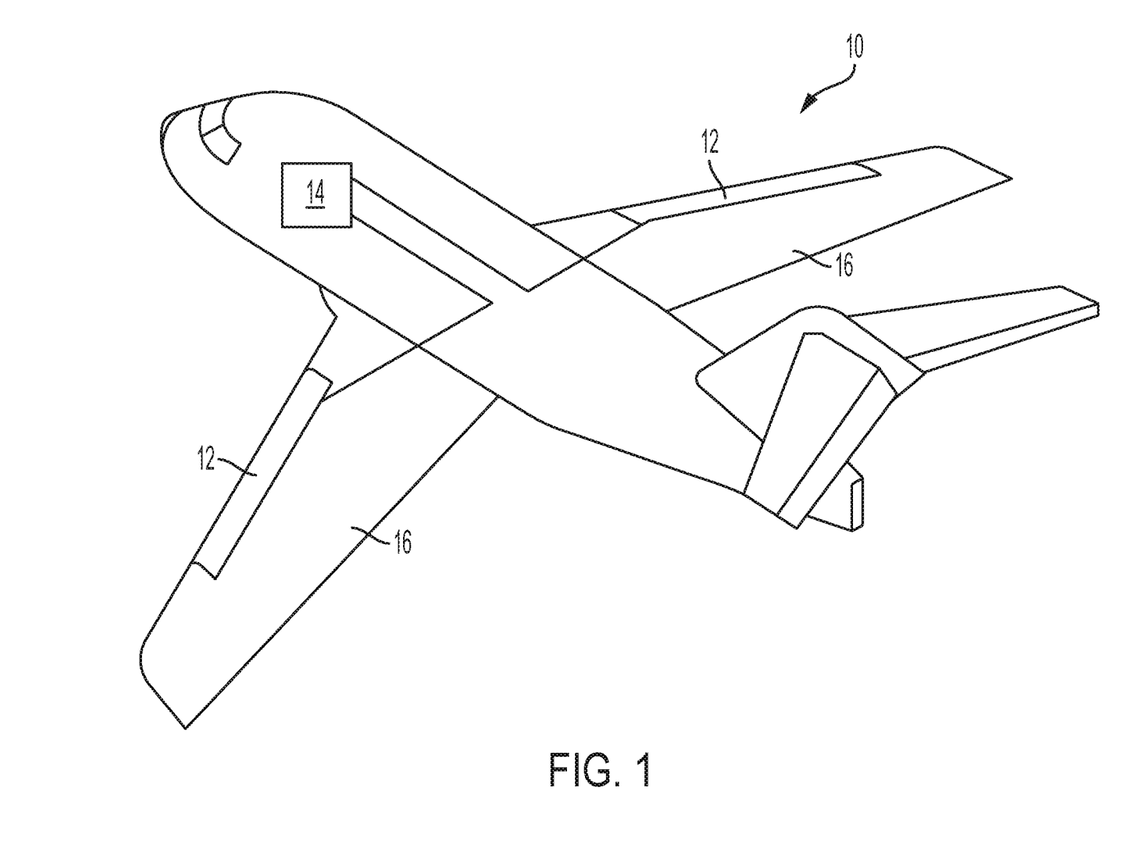
FIG. 1 depicts an aircraft implementing an ice protection system that includes a frequency dependent susceptor according to a non-limiting embodiment.

Turning now to FIG. 1, an aircraft 10 is illustrated implementing ice protection systems 12 and a controller 14. The ice protection systems 12 include a frequency dependent susceptor and a radio frequency (RF) supply, each of which are described in greater detail below. The frequency dependent susceptor includes a susceptor material which has a high absorption at one frequency but not another, thereby permitting selective absorption by the susceptor to grow the Faraday layer corresponding to ice formed thereon. The frequency dependent susceptor can operate at any frequency above 1 GHz so long as it is designed to have a microwave "window" to allow selective heating of the Faraday layer. Accordingly, the RF supply can be operated to deliver RF energy to the frequency dependent susceptor and the controller 14 controls the RF supply to adjust the output RF energy level and/or RF frequency.

In the illustrated embodiment, the ice protection systems 12 are shown disposed on the wings 16 of the aircraft 10. It should be appreciated, however, that they could additionally or alternatively be secured to other critical surfaces of the aircraft 10 including, but not limited to, other airfoils, stabilizers, engine inlets, and rotors, along with and other ice-susceptible aircraft components.

Figure 2:
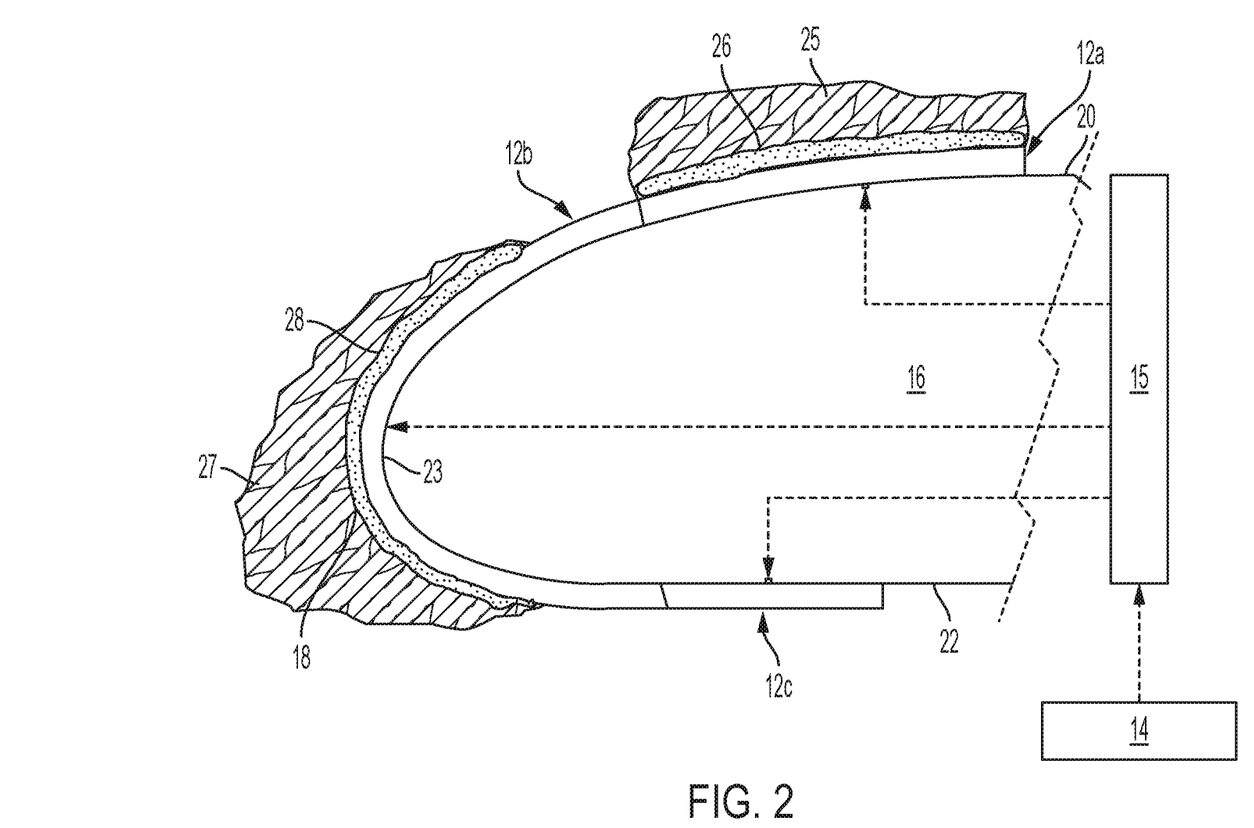
FIG. 2 depicts a leading edge of an aircraft airfoil having formed thereon an ice protection system including a frequency dependent susceptor according to a non-limiting embodiment.

Referring to FIG. 2, a plurality of individual ice protection systems 12a, 12b, 12c are formed on an aircraft wing 16 according to a non-limiting embodiment. Although a wing 16 is described, it should be appreciated that the ice protection systems 12a, 12b, 12c can be utilized to remove ice from other types of critical surfaces without departing from the scope of the inventive teachings.

The wing 16 includes an upper surface 20, a lower surface 22, and a leading edge 23. A first ice protection system 12a is formed on the wing upper surface 20, a second ice protection system 12b is formed on the wing leading edge 23, and a third ice protection system 12c is formed on the wing lower surface 22. Although three individual ice protection system 12a-12c are illustrated, it should be appreciated that a single ice protection system 12 can be utilized that extends continuously across the wing upper surface 20, the wing leading edge 23, and the wing lower surface 22.

The wing 16 is further shown having a first accumulation of ice 25 covering the wing upper surface 20 and a second accumulation of ice 27 covering the leading edge 23. Associated with each accumulation of ice 25 and 27 is a layer of liquid-like water referred herein as a "Faraday layer." For instance a first Faraday layer 26 of liquid water is interposed between the first accumulation of ice 25 and the first ice protection system 12a, while a second Faraday layer 28 of liquid water is interposed between the second accumulation of ice 27 and the second ice protection system 12b.

With continued reference to FIG. 2, an RF energy supply 15 is illustrated in signal communication with each of the ice protection systems 12a, 12b and 12c. The RF energy source 15 is configured to deliver RF energy to the ice protection systems 12a, 12b and 12c. The controller 14 is in signal communication with the RF energy supply 15. The controller 14 is configured to selectively operate the RF energy source 15 according to a susceptor absorbing mode and a water absorbing mode. When operating in the susceptor absorbing mode, the RF energy source 15 outputs RF energy having a first frequency set according to a material of the susceptor to allow the a frequency dependent susceptor to substantially absorb the RF energy. When operating in the water absorbing mode, the RF energy source 15 outputs RF energy having a second frequency different from the first frequency to fully or at least partially pass through the frequency dependent susceptor and heat the liquid water of the increased Faraday layer.

Figure 3A:
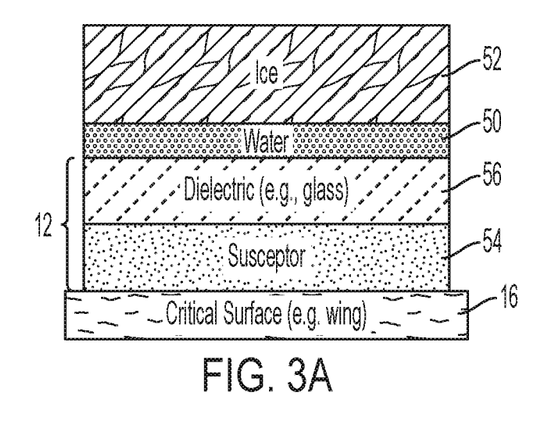
FIG. 3A depicts an ice protection system including a frequency dependent susceptor according to a non-limiting embodiment.

FIGS. 3A, 3B, 3C and 3D illustrate the aircraft ice protection system 12 according to various non-limiting embodiments. Turning to FIG. 3A, for example, the aircraft ice protection system 12 is interposed between a critical surface 16 (e.g., a wing) and a combination of ice 52 and a Faraday layer of liquid water 50 covering the critical surface 16. The aircraft ice protection system 12 includes a frequency dependent susceptor 54 disposed on an upper surface of the critical surface 16 and a dielectric layer 56 disposed on an upper surface of the frequency dependent susceptor 54. Accordingly, the ice 52 covers the ice protection system 12 with the Faraday layer of liquid water 50 formed directly on an upper surface of the dielectric layer 56. In one or more non-limiting embodiments, the dielectric layer 56 can include, but is not limited to glass or fiber glass. In addition, the frequency dependent susceptor 54 includes a thin dielectric layer having an upper surface and an opposing lower surface. At least one of the upper surface and the lower surface includes a patterned metallic structure configured to define an absorbance and transmittance response with respect to a frequency of applied RF energy. In this manner, the frequency dependent susceptor 54 can be tuned to attenuate according to a targeted frequency of RF energy.

Figure 3B:
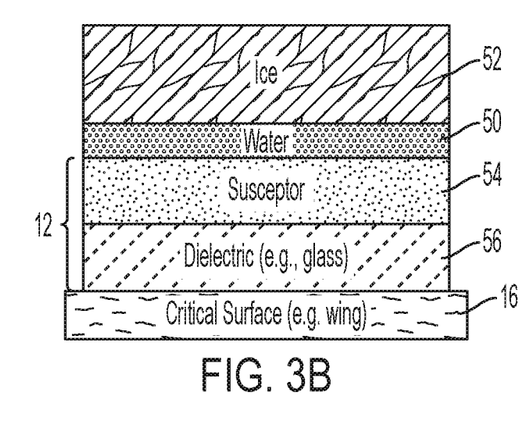
FIG. 3B depicts an ice protection system including a frequency dependent susceptor according to a non-limiting embodiment.

According to another non-limiting embodiment illustrated in FIG. 3B, the aircraft ice protection system 12 is interposed between a critical surface 16 (e.g., a wing) and a combination of ice 52 and a Faraday layer of liquid water 50 covering the critical surface 16. In this example, the aircraft ice protection system 12 includes a dielectric layer 56 disposed on an upper surface of the critical surface 16 and a frequency dependent susceptor 54 disposed on an upper surface of the dielectric layer 56. Accordingly, the ice 52 covers the ice protection system 12 with the Faraday layer of liquid water 50 formed directly on an upper surface of the frequency dependent susceptor 54.

Figure 3C:
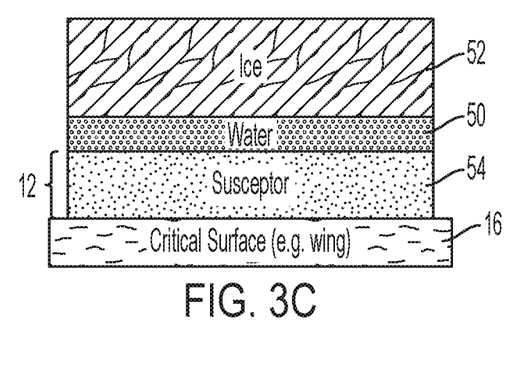
FIG. 3C depicts an ice protection system including a frequency dependent susceptor according to a non-limiting embodiment.
Figure 3D:
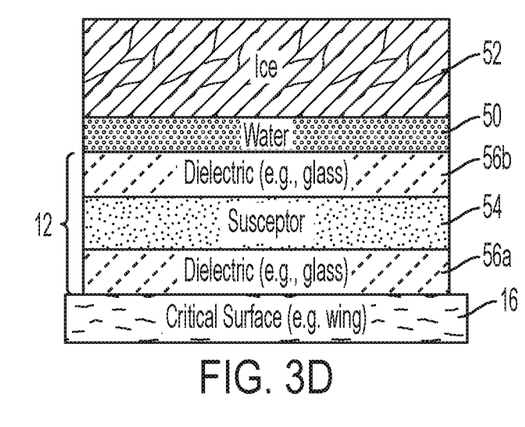
FIG. 3D depicts an ice protection system including a frequency dependent susceptor according to a non-limiting embodiment.

According to yet another non-limiting embodiment illustrated in FIG. 3C, the aircraft ice protection system 12 is interposed between a critical surface 16 (e.g., a wing) and a combination of ice 52 and a Faraday layer of liquid water 50 covering the critical surface 16. In this example, the aircraft ice protection system 12 includes a frequency dependent susceptor 54 disposed on an upper surface of the critical surface 16, but excludes a dielectric layer. Accordingly, the ice 52 covers the ice protection system 12 with the Faraday layer of liquid water 50 formed directly on an upper surface of the frequency dependent susceptor 54.

According to still another non-limiting embodiment illustrated in FIG. 3C, the aircraft ice protection system 12 is interposed between a critical surface 16 (e.g., a wing) and a combination of ice 52 and a Faraday layer of liquid water 50 covering the critical surface 16. In this example, the aircraft ice protection system 12 includes a frequency dependent susceptor 54 interposed between a first dielectric layer 56a and a second dielectric layer 56b. The first dielectric layer 56a is disposed on an upper surface of the critical surface 16. Accordingly, the ice 52 covers the ice protection system 12 with the Faraday layer of liquid water 50 formed directly on an upper surface of the s second dielectric layer 56b.

Figure 4:
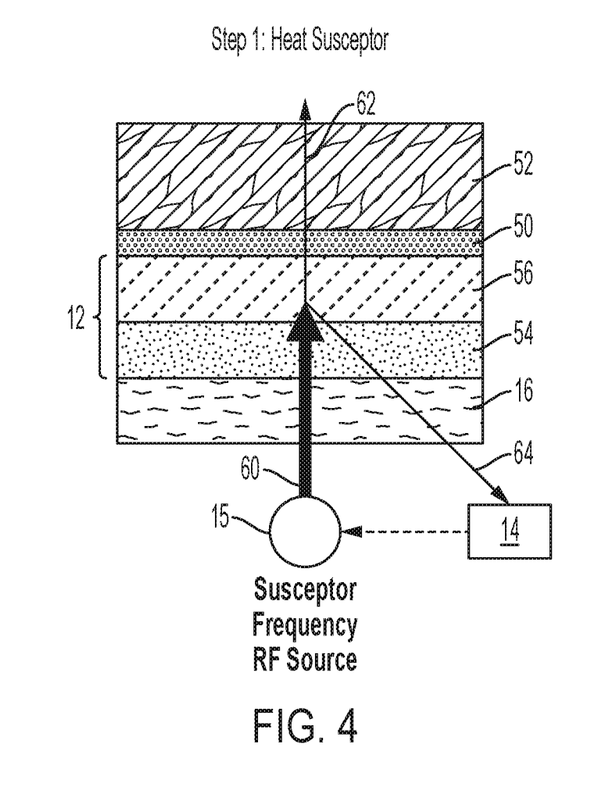
FIG. 4 depicts an ice protection system including a frequency dependent susceptor operating in a susceptor absorbing mode according to a non-limiting embodiment.
Figure 5:
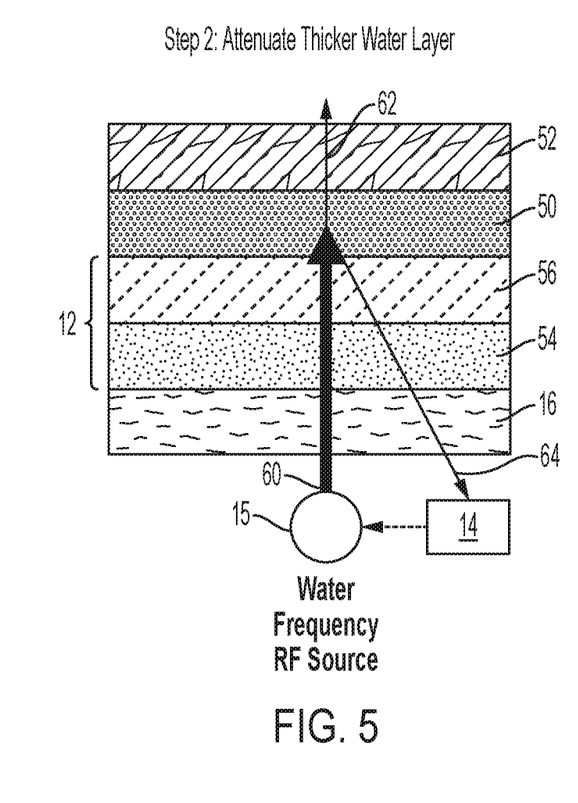
FIG. 5 depicts an ice protection system including a frequency dependent susceptor operating in a susceptor absorbing mode according to a non-limiting embodiment.

With reference now to FIGS. 4 and 5, the ice protection system 12 is illustrated selectively controlled to operate in two different operating modes according to non-limiting embodiments of the present teachings. The two operating modes (i.e., a susceptor absorbing mode and a water absorbing mode) allow the ice protection system 12 to perform a two-step process to remove ice 52 from a critical surface 16.

Turning first FIG. 4, the ice protection system 12 is shown operating in the susceptor absorbing mode to perform the first step. When operating in the susceptor absorbing mode, the controller 14 controls the RF energy source 15 to output RF energy 60 having a first frequency set to attenuate the frequency dependent susceptor 54. In one or more non-limiting embodiments, the first frequency is about 2.5 GHz. As a result, the frequency dependent susceptor 54 absorbs more energy than it transmits. Accordingly, the frequency dependent susceptor 54 converts the RF energy 60 output from the RF energy source 15 into thermal energy 62 (e.g., heat), which melts the ice 52 and creates a larger Faraday layer 50 (i.e., increases the thickness of the Faraday layer 50) at the surface of the ice 52.

Turning to FIG. 5, the ice protection system 12 is shown after switching from the susceptor absorbing mode to the water absorbing mode. When operating in the water absorbing mode, the controller 14 controls the RF energy source 15 to output RF energy 60 having a second frequency set to fully or at least partially pass through the frequency dependent susceptor 54, while still capable of attenuating the liquid water of the increased Faraday layer 50. In one or more non-limiting embodiments, the second frequency is about 22 GHz, but it should be appreciated that other frequencies capable of allowing the RF to pass through the selected material of the frequency dependent susceptor 54 can be utilized without departing from the scope of the invention. Rather than absorbing the RF energy 60, the frequency dependent susceptor 54 passes the RF energy 60 therethrough and effectively transmits it to the Faraday layer 50. Accordingly, the increased thickness of the water now allows the Faraday layer 50 to effectively absorb the RF energy 60 and convert it into thermal energy 62 (e.g., heat) that continues to melt the ice 52 and leads to removing it from the critical surfaced 16.

In one or more non-limiting embodiments, the controller 14 is configured to switch from the susceptor absorbing mode to the water absorbing mode in response to determining the Faraday layer 50 has reached a target characteristic or property. The target characteristic or property can include a target thickness (e.g., greater than or equal to 1.0 mm), or a target absorptive property. For example, the controller 14 can determine a time period during which the RF energy 60 having the first frequency is delivered to the frequency dependent susceptor 54. Accordingly, the controller determines the Faraday layer 50 has reached the target characteristic or property in response to the time period exceeding a time period threshold.

According to another example, the controller 14 determines scattering parameters (often referred to as "S-parameters") of the RF energy 60 having the first frequency and determines one or both of a transmission coefficient and a reflection coefficient of the RF energy 60 having the first frequency. Accordingly, the controller 14 determines the Faraday layer 50 has reached the target characteristic or property in response to the transmission coefficient being less than a transmission coefficient threshold and/or the reflection coefficient being greater than a reflection coefficient threshold. As described herein, the characteristic or property can include, for example, a target thickness (e.g., greater than or equal to 1.0 mm), or a target absorptive property.

Figure 6:
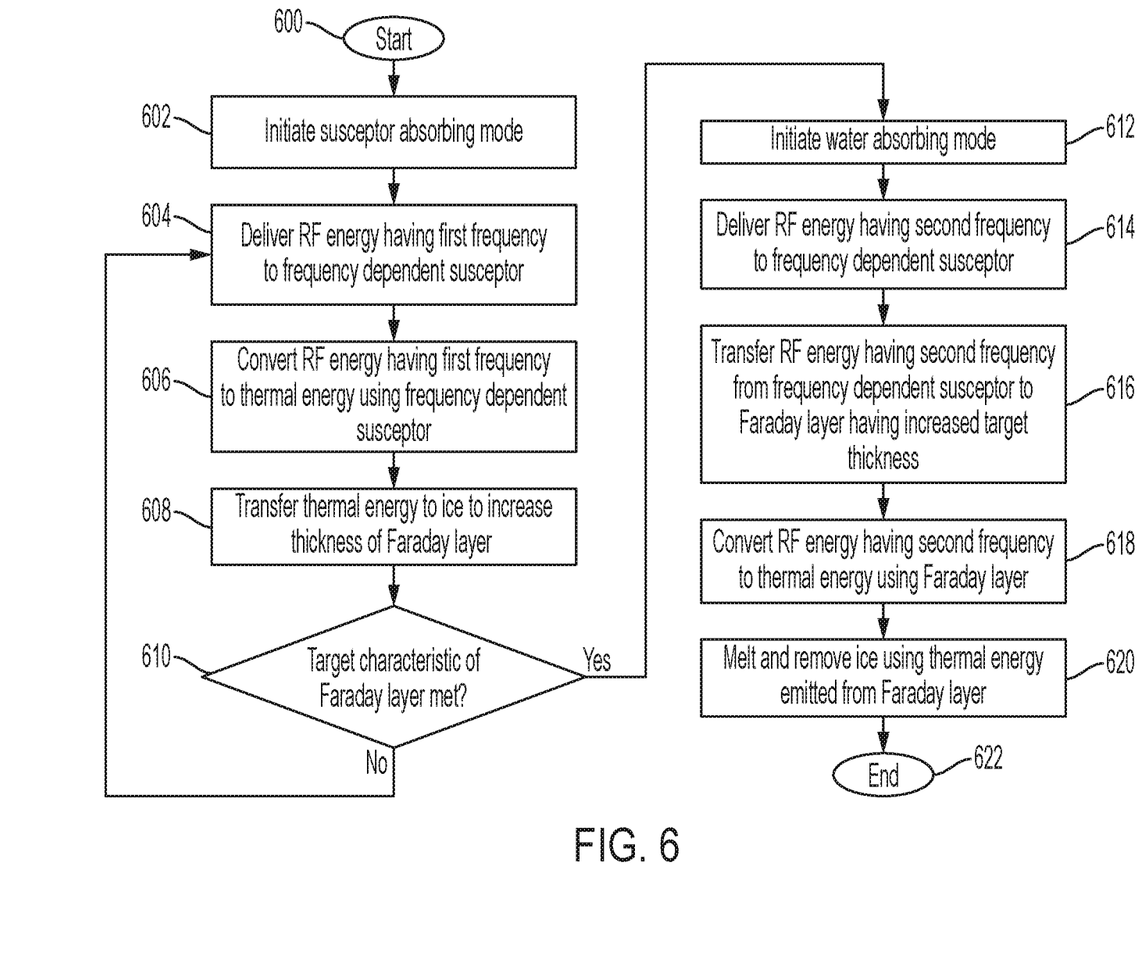
FIG. 6 is a flow diagram illustrating a method of removing ice from a critical surface of an aircraft according to a non-limiting embodiment.

With reference now to FIG. 6, a method of removing ice from a critical surface of an aircraft is illustrated according to a non-limiting embodiment. The method begins at operation 600 and at operation 602 a susceptor absorbing mode of an ice protection system installed on the aircraft is initiated. At operation 604, an RF energy source delivers RF energy having a first frequency is delivered to a frequency dependent susceptor included in the ice protection system. According to a non-limiting embodiment, the RF energy has a frequency (e.g., 2.5 GHz) that is set to attenuate the frequency dependent susceptor. At operation 606, the frequency dependent susceptor absorbs the RF energy having the first frequency and converts it into thermal energy. At operation 608, the thermal energy is emitted from the frequency dependent susceptor and delivered to the ice covering the critical surface such that the ice begins to melt thereby increasing the thickness of the liquid water defining the Faraday layer associated with the ice. At operation 610, a determination is made as to whether the characteristic or property of the Faraday layer reaches a target characteristic or property. In one or more non-limiting embodiments the target specification or property can include a target thickness. When the Faraday layer has not met the target characteristic or property (e.g., is less than a target thickness), the method returns to operation 604 and continues delivering the RF energy having the first frequency.

When, however, the Faraday layer meets the target characteristic or property (e.g., is greater than or equal to a target thickness) at operation 610, the method proceeds to operation 612 and initiates a water absorbing mode of the ice protection system. At operation 614, the RF energy source delivers RF energy having a second frequency that allows the RF energy to fully or at least partially pass through the frequency dependent susceptor 54, while still capable of heating the liquid water of the increased Faraday layer 50. According to a non-limiting embodiment, the RF energy has a frequency that is set to attenuate the water of the Faraday layer rather than the frequency dependent susceptor. In one or more non-limiting embodiments, the second frequency is set to about 22 GHz, but it should be appreciated that other frequencies capable of allowing the RF to pass through the selected material of the frequency dependent susceptor 54 can be utilized without departing from the scope of the invention. At operation 616, the frequency dependent susceptor passes the RF energy having the second frequency and transmits it (e.g., passes it through) to the Faraday layer defined by the increased thickness of water. At operation 618, the water of the Faraday layer absorbs the RF energy having the second frequency and converts it into thermal energy. At operation 620, the thermal energy is emitted from the Faraday layer and continues melting the ice such that it is ultimately removed from the critical surface. At operation 622, the method ends.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. An aircraft ice protection system comprising:
    a frequency dependent susceptor coupled to a critical surface of an aircraft;
    a radio frequency (RF) energy source configured to apply RF energy to the frequency dependent susceptor,
    wherein the aircraft ice protection system is configured to selectively operate in a susceptor absorbing mode and a water absorbing mode.

2. The aircraft ice protection system of claim 1, wherein the RF energy source delivers the RF energy having a first frequency to the frequency dependent susceptor in response to operating in the susceptor absorbing mode, and delivers the RF energy having a different second frequency to the frequency dependent susceptor in response to operating in the water absorbing mode.

3. The aircraft ice protection system of claim 2, wherein the RF energy having the first frequency attenuates the frequency dependent susceptor to emit heat therefrom, and wherein the RF energy having the second frequency is transmitted from the frequency dependent susceptor to attenuate a Faraday layer defining a layer of liquid water formed on ice present on the critical surface.

4. The aircraft ice protection system of claim 3, wherein the first frequency falls within a frequency range that includes a first attenuation frequency of a material of the frequency dependent susceptor, and wherein the second frequency falls within a second range that includes a second attenuation frequency of the liquid water.

5. The aircraft ice protection system of claim 4, wherein the first frequency is different from the second frequency.

6. The aircraft ice protection system of claim 4, further comprising a controller in signal communication with the radio frequency (RF) energy source, the controller configured to selectively invoke the susceptor absorbing mode and the water absorbing mode.

7. The aircraft ice protection system of claim 6, wherein the controller is configured to switch from the susceptor absorbing mode to the water absorbing mode in response to determining the Faraday layer has a target characteristic.

8. The aircraft ice protection system of claim 7, wherein the controller determines a time period during which the RF energy having the first frequency is delivered to the frequency dependent susceptor, and determines the Faraday layer has the target characteristic in response to the time period exceeding a time period threshold.

9. The aircraft ice protection system of claim 6, wherein the controller determines scattering parameters of the RF energy having the first frequency and determines one or both of a transmission coefficient and a reflection coefficient of the RF energy having the first frequency, and wherein the controller determines the Faraday layer has the target characteristic in response to one or both of the transmission coefficient being less than a transmission coefficient threshold or the reflection coefficient being greater than a reflection coefficient threshold.

10. The aircraft ice protection system of claim 1, further comprising at least one dielectric layer covering the critical surface.

11. The aircraft ice protection system of claim 1, wherein the frequency dependent susceptor includes a thin dielectric layer having an upper surface and an opposing lower surface, and wherein at least one of the upper and lower surfaces includes a patterned metallic structure configured to define an absorbance and transmittance response with respect to a frequency of applied RF energy.

12. A method of removing ice from a critical surface of an aircraft, the method comprising:
    applying, by a radio frequency (RF) energy source, RF energy to a frequency dependent susceptor coupled to the critical surface;
    selectively operating the aircraft ice protection system in a susceptor absorbing mode and a water absorbing mode; and
    removing the ice from the critical surface based on the susceptor absorbing mode and a water absorbing mode.

13. The method of claim 12, further comprising:
    delivering, by the RF energy source, the RF energy having a first frequency to the frequency dependent susceptor in response to operating in the susceptor absorbing mode; and
    delivering the RF energy having a different second frequency to the frequency dependent susceptor in response to operating in the water absorbing mode.

14. The method of claim 13, further comprising:
    attenuating the frequency dependent susceptor using the RF energy having the first frequency attenuates to emit heat therefrom; and
    transmitting the RF energy having the second frequency from the frequency dependent susceptor to attenuate a Faraday layer defining a layer of liquid water formed on ice present on the critical surface.

15. The method of claim 14, wherein the first frequency falls within a frequency range that includes a first attenuation frequency of a material of the frequency dependent susceptor, and wherein the second frequency falls within a second range that includes a second attenuation frequency of the liquid water.

16. The method of claim 15, wherein the first frequency is different from the second frequency.

17. The method of claim 15, further comprising:
    determining a target characteristic of the Faraday layer;
    detecting the Faraday layer achieves the target characteristic in response to delivering the RF energy having a first frequency during the susceptor absorbing mode; and
    switching from the susceptor absorbing mode to the water absorbing mode in response to detecting the Faraday layer has the target characteristic.

18. The method of claim 17, further comprising:
    determining a time period during which the RF energy having the first frequency is delivered to the frequency dependent susceptor; and determining the Faraday layer has the target characteristic in response to the time period exceeding a time period threshold.

19. The method of claim 17, further comprising:

determining scattering parameters of the RF energy having the first frequency;

determining one or both of a transmission coefficient and a reflection coefficient of the RF energy having the first frequency; and determining the Faraday layer has the target characteristic in response to one or both of the transmission coefficient being less than a transmission coefficient threshold or the reflection coefficient being greater than a reflection coefficient threshold.

20. The method of claim 12, wherein the frequency dependent susceptor includes a thin dielectric layer having an upper surface and an opposing lower surface, and wherein at least one of the upper and lower surfaces includes a patterned metallic structure configured to define an absorbance and transmittance response with respect to a frequency of applied RF energy.

\* \* \* \* \*